United States Patent [19]

Okamoto et al.

[11] 4,413,212
[45] Nov. 1, 1983

[54] MOTOR CONTROL APPARATUS

[75] Inventors: Kiyokazu Okamoto; Masayoshi Isomura, both of Tokyo, Japan

[73] Assignee: Nippon Electric Co., Ltd., Tokyo, Japan

[21] Appl. No.: 343,233

[22] Filed: Jan. 27, 1982

[30] Foreign Application Priority Data

Feb. 4, 1981 [JP] Japan .................... 56-15483

[51] Int. Cl.³ ............................................. H02P 5/16
[52] U.S. Cl. .................................. 318/317; 318/327; 318/341
[58] Field of Search ............... 318/341, 317, 326, 561, 318/599

[56] References Cited

U.S. PATENT DOCUMENTS

| 3,629,633 | 12/1971 | O'Callaghan | 318/317 X |
| 4,090,116 | 5/1978 | Lippitt | 318/327 X |
| 4,129,810 | 12/1978 | Harshberger, Jr. | 318/317 |
| 4,201,936 | 5/1980 | Roumanis | 318/341 |
| 4,381,479 | 4/1983 | Wesling | 318/341 X |

Primary Examiner—B. Dobeck
Attorney, Agent, or Firm—Blakely, Sokoloff, Taylor & Zafman

[57] ABSTRACT

There is provided a digitized motor control apparatus which is capable of digitally effecting all the functions of the motor control apparatus except those involved in energy conversion.

3 Claims, 27 Drawing Figures

FIG.8
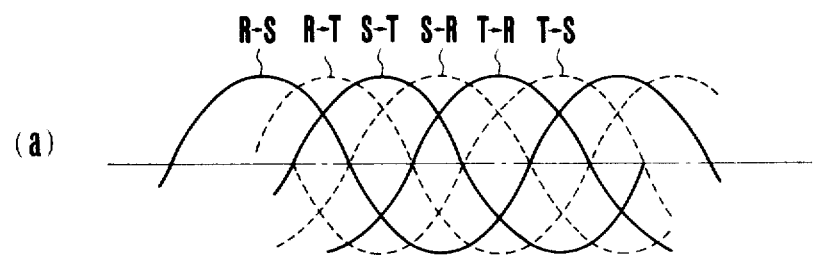
(a)
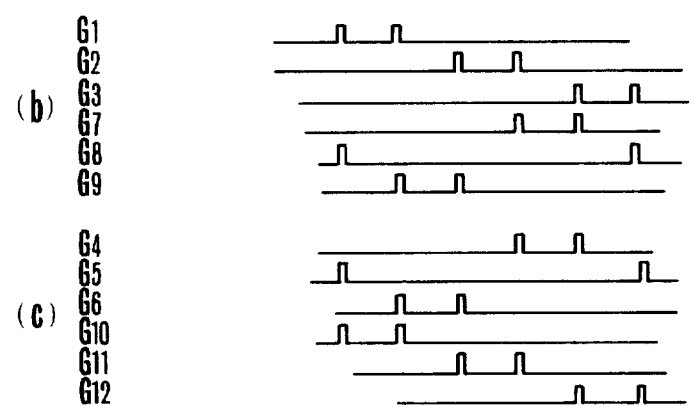
(b) G1 G2 G3 G7 G8 G9
(c) G4 G5 G6 G10 G11 G12
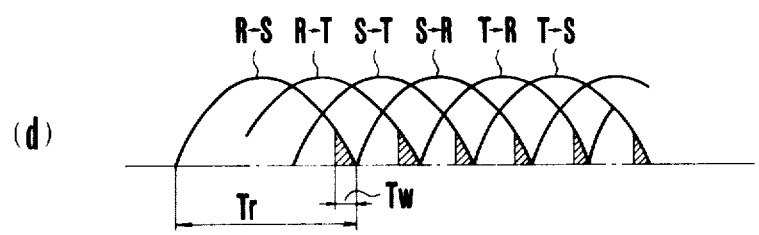
(d)

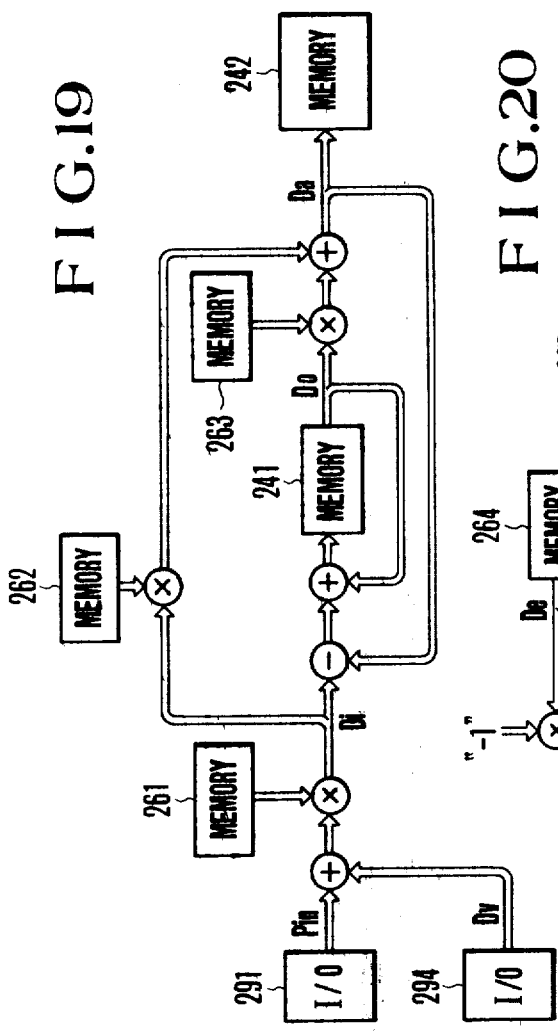
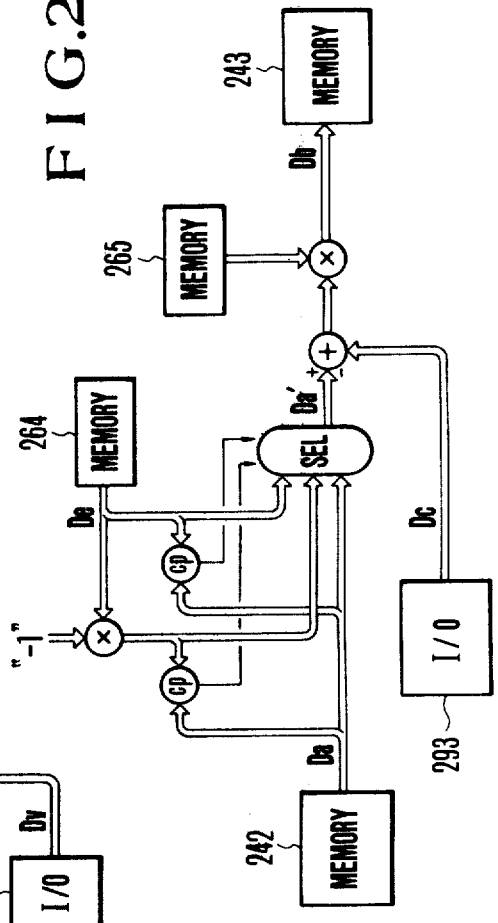

MOTOR CONTROL APPARATUS

BACKGROUND OF THE INVENTION

This invention relates to a motor control apparatus, and more particularly to a motor control apparatus for supplying electric power to a motor so that the motor may have a desired response characteristic, by enabling transistors, thyristors or the like elements to be switched in accordance with a given velocity command data. Control apparatus of this type is widely used for the control of moving elements such as, for example, a machine tool and a rolling machine.

Conventionally, the motor control apparatus has invariably relied upon analog electric circuits to effect the desired control. As is widely known, the analog circuit can realize the function required of the motor control apparatus by using an operational amplifier and passive elements such as resistors, capacitors and diodes. The analog circuit incorporates numerous kinds of parts totalling a large number and requires many variable resistors for adjusting irregularities in the accuracy of such parts and for fixing the control characteristics. And the adjustment of these variable resistors calls for much time and labor. In addition, the phenomenon of drift and other causes of instability inherent to the analog circuit cannot be completely wiped out.

SUMMARY OF THE INVENTION

It is therefore a major object of this invention to digitize the motor control apparatus.

Another object of this invention is to provide a motor control apparatus capable of digitaly effecting all the functions of the motor control apparatus except those involved in conversion of energy.

According to this invention, all the functions fulfilled by analog circuits in the prior art apparatus, except for the energy conversion, are performed by a digital processor. The adoption of the digital processor completely eliminates the disadvantages of the conventional analog circuit, i.e., inevitable use of numerous parts, troublesome adjustment of the variable resistors, and instability due to drift. If further permits inexpensive materialization of a motor control apparatus which can assure advanced functions that have hitherto been unattainable.

BRIEF DESCRIPTION OF THE DRAWINGS

FIG. 8 illustrates in sections (a) through (d) a time chart useful in explaining the operation of the power amplifier of FIG. 7;

FIG. 19 is a block diagram showing an embodiment of the execution of the function of velocity amplifier by the processor;

FIG. 20 is a block diagram showing an embodiment of the execution of the function of current amplifier by the processor;

DESCRIPTION OF PREFERRED EMBODIMENTS

Now, a conventional motor control apparatus will first be described. Then, the fact that the various functions of the conventional motor control apparatus can be materialized by a digital processor in accordance with the present invention will be described.

Figure 1:
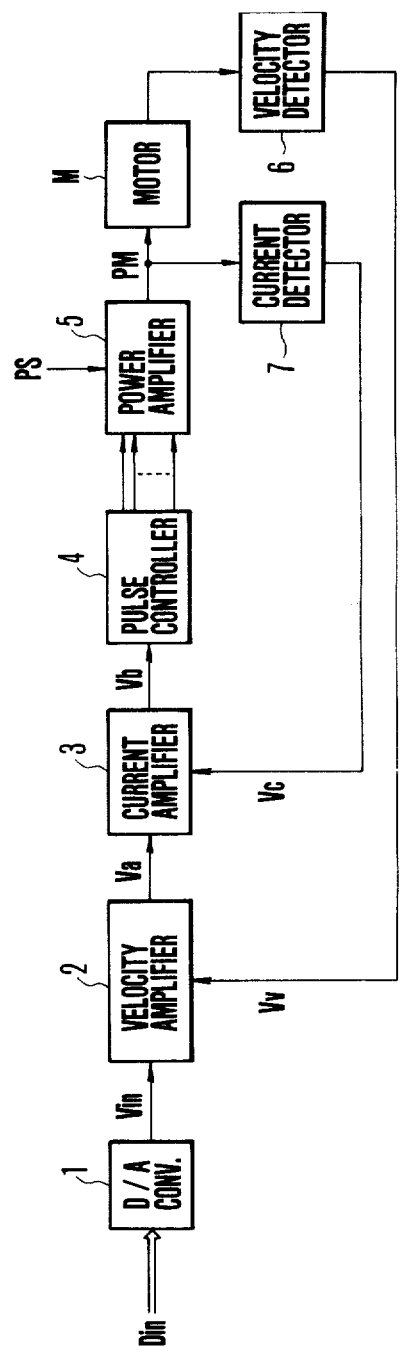
FIG. 1 is a block diagram of a conventional motor control apparatus.

FIG. 1 is a block diagram of the conventional motor control apparatus. Denoted by M is a motor to be controlled or a moving body to be driven by a motor. The motor control apparatus is adapted to supply control power PM to the motor M so that the M may desirably respond to a velocity command Din applied. For this purpose, the motor M is provided with a velocity detector 6 to establish a velocity feedback loop for a velocity detecting signal Vv. A current detector 7 detects electric current flowing through the motor and also establishes a current feedback loop by the use of a current detecting signal Vc. The detector 6 may be a tacho-generator and the detector 7 may be a known current detector utilizing a Hall element. Where the velocity command Din is externally supplied in the form of digital data as from a computer, it is converted into an analog voltage Vin by a D/A converter 1 and then transmitted, together with the velocity detecting signal Vv to a velocity amplifier 2. The velocity amplifier 2 determines a gain of the velocity feedback loop and compensates for the motor characteristic. A current command Va which is the output of the velocity amplifier 2 is transmitted, along with the current detecting signal Vc, to a current amplifier 3. The current amplifier 3 applies a current limit to prevent flow of excess current to the motor and determines a gain of the current feedback loop. The output of the current amplifier 3 is a drive command Vb to the motor. This drive command Bv is converted into an on-off pulse signal by a pulse controller 4 to permit the reception of the command by a power amplifier 5 which is constituted by thyristors or transistors.

Where the power amplifier 5 is formed of transistors, this pulse signal is a pulse-width modulated (PWM) pulse to be fed to the base of the transistors. Where the power amplifier 5 is formed of thyristors, this pulse signal is a phase-controlled firing pulse to be fed to the gate of the thyristors. The power amplifier 5 couples electric power from a power source PS to the motor in accordance with the mode of application of the aforementioned pulses. With reference to FIG. 1, the initial velocity command Din is in the form of a digital data, whereas the final output fed to the motor is in the form of electric power controlled by the on-off pulse. In this example, therefore, the digital data is converted to an analog voltage, the analog voltage is again converted into an on-off digital data through the medium of an analog circuit and, finally, the supply of electric power is controlled by the digital signal. In FIG. 1, D/A converter 1 serves to convert digital signals into analog signals, the amplifier 5 serves to supply energy controlled by pulse signals (energy conversion) and the velocity and current detectors 6, 7 serve to convert such physical quantities as velocity and current into voltages. None of these conversions impart any special function to the relevant signals. Functioning of the signals is carried out in the blocks 2 through 4. Now, the blocks 2 through 4 will be described more specifically.

Figure 2:
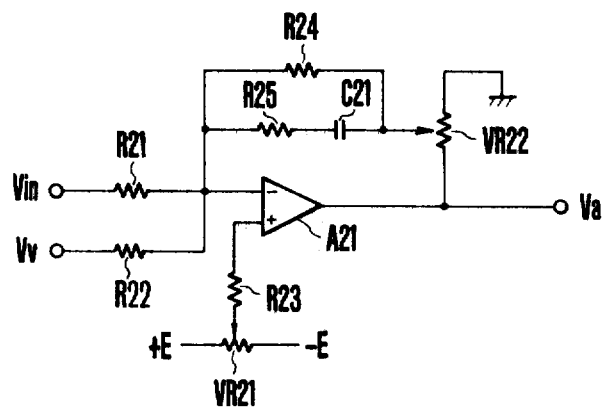
FIG. 2 is a circuit diagram of a conventional velocity amplifier.

FIG. 2 is a typical circuit of the velocity amplifier 2. This circuit is composed of an operational amplifier A21, resistors R21 to R25, a capacitor C21, and variable resistors VR21 and VR22. As is well known, the operation of this circuit can expressed by the following formula.

$$Va = KV[T2S+1)/(T1S+1)](Vin+Vv) \quad (1)$$

where S denotes a differential operator, Vv is an output delivered out of the velocity detector 6 in the opposite phase to Vin, T1 and T2 are time constants determined by R24 to R25 and C21 and they function to improve the static characteristic of the motor, attaining the so-called phase-delay compensation, and KV represents a velocity loop gain which can be adjusted by VR22. The variable resistor VR21 is used for balancing the null point.

Figure 3:
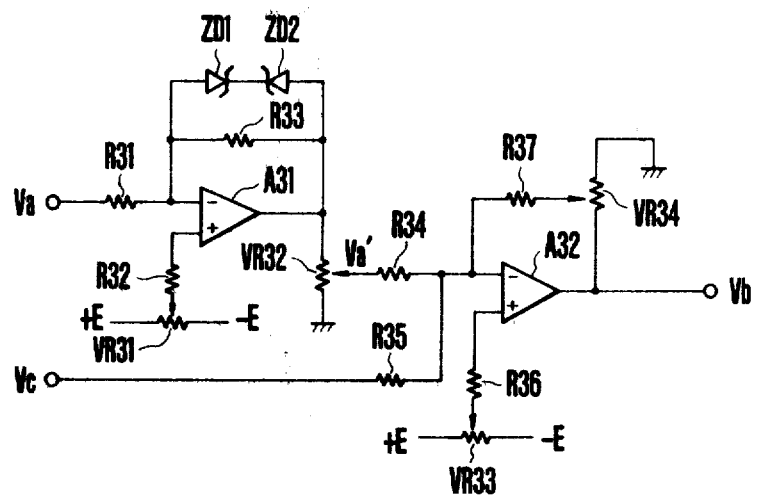
FIG. 3 is a circuit diagram of a conventional current amplifier.

FIG. 3 is a typical circuit of the current amplifier 3. It is composed of operational amplifiers A31 and A32, resistors R31 to R37, Zener diodes ZD1 and ZD2, and variable resistors VR31 to VR34. The preceding amplifier A31 is a current limiter. The value of electric current to be limited is adjusted by VR32. The subsequent amplifier A32 receives the current detecting signal Vc and serves to adjust the gain of the current feedback loop by VR34. The signal Vc is assumed to be detected by the detector 7 in the opposite phase to the output Va' from the preceding amplifier. The variable resistors VR31 and VR33 are used for balancing the null point.

Figure 4:
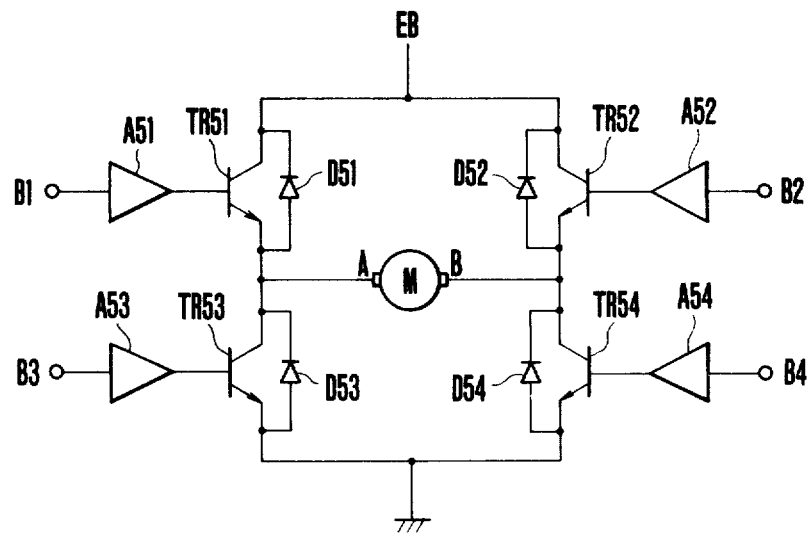
FIG. 4 is a circuit diagram of a power amplifier using transistors.

Preparatory to description of the pulse controller 4, the power amplifier 5 will be described. This order of description is important because the pulse controller 4 is used for producing signals which are adapted for the reception by the power amplifier 5. FIG. 4 is a typical power amplifier 5 using transistors. To the motor M, the electric power is supplied by transistors TR51 to TR54. Output signals B1 to B4 of the pulse controller are fed through isolation amplifiers A51 to A54 to the bases of the transistors TR51 to TR54, respectively. By the signals B1 to B4, the transistors TR51 to TR54 are turned on or off. The isolation amplifiers A51 to A54 serve to keep the signals B1 to B4 electrically isolated from a power source EB and supply base currents sufficient to turn on the transistors TR51 to TR54. These amplifiers may be constituted by circuits well known in the art. The diodes D51 and D54 serve to protect the transistors TR51 to TR54 against possible breakage of the counter electromotive force of the motor.

Figure 5:
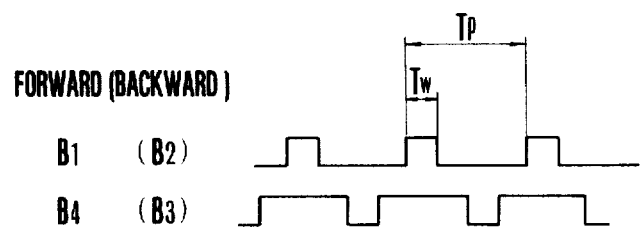
FIG. 5 and FIG. 6 are time charts useful in explaining the operation of the power amplifier of FIG. 4.

It is now assumed that the motor M rotates forwardly when the electric current flows from A to B. During the forward rotation of the motor, the electric current flows through the motor in the direction of from TR51 to TR54. When the signals B1 and B2 are pulses as illustrated in FIG. 5, therefore, the electric current flows to the motor during a portion Tw of one period Tp. This means that the electric current of the motor can be controlled by adjusting the length of the time interval Tw. Of course, the transistors TR52 and TR53 remain off in this while. For backward rotation of the motor, the transistors TR51 and TR54 are kept off and the transistors TR52 and TR53 are turned on or off by means of the signals B2 and B3. The pulse width of B4 is greater than that of B1. This difference is necessary for absorption of the counter electromotive force of the motor. The electric current to be supplied to the motor is controlled by B1.

Figure 6:
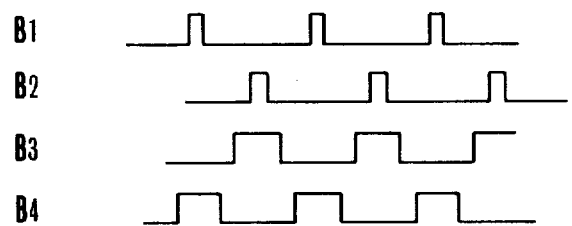

To improve the response of the motor during the stoppage, pulses for forward rotation and those for backward rotation are produced alternately as illustrated in FIG. 6. The series of the on-off operations of the transistors TR51 to TR54 is wholly governed by the pulses of the signals B1 to B4.

Although, in FIG. 4, transistors are used as switching elements, other switching elements such as gate turn-off thyristors or MOS FETs may obviously employed.

Figure 7:
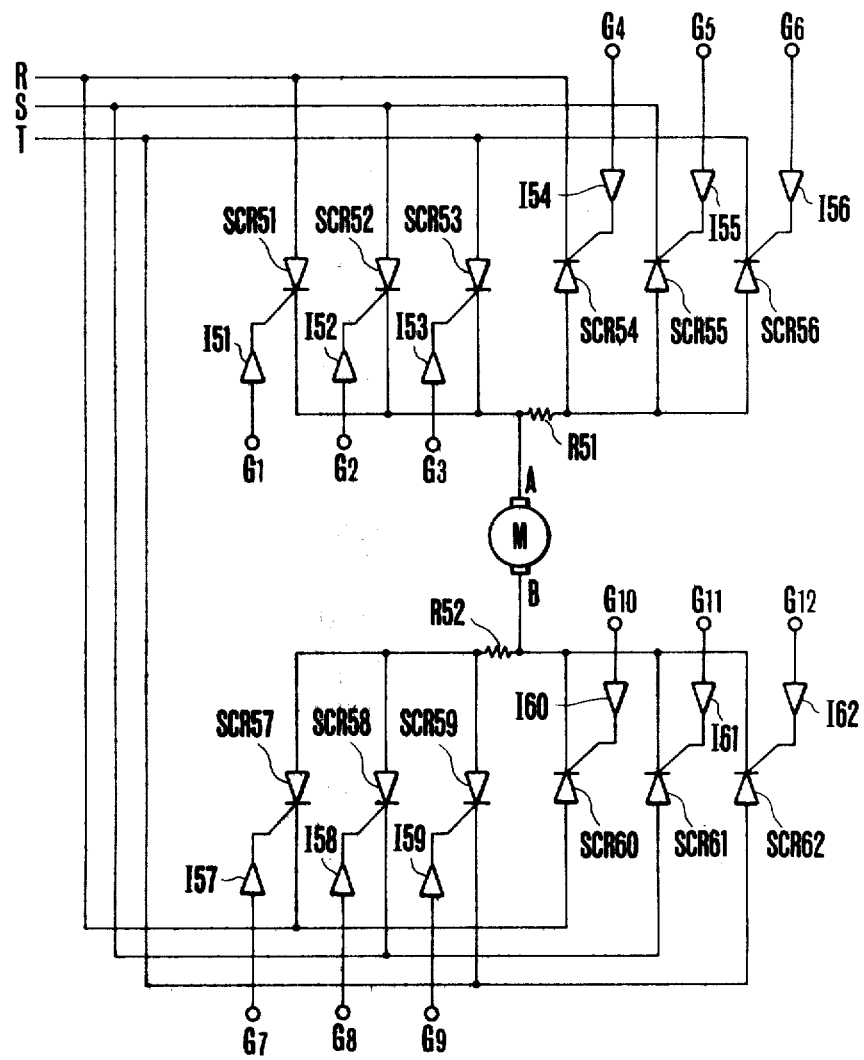
FIG. 7 is a circuit diagram of a power amplifier using thyristors.

Now, the power amplifier formed of thyristors will be described. FIG. 7 is a typical power amplifier 5 formed of thyristors. This system called a three-phase full wave type. Through the medium of thyristors SCR51 to SCR62, the electric power is supplied from a three-phase AC power source RST to the motor. Similarly to the power amplifier formed of transistors, it is assumed that the motor rotates forwardly when the electric current flows from A to B. Then, SCR 51 to SCR53 and SCR57 to SCR59 are used for the forward rotation of the motor and SCR54 to SCR56 and SCR60 to SCR62 are used for the backward rotation of the motor. Denoted by G1 through G12 are output signals of the pulse controller 4. They are sent through isolation amplifiers I51 to I62 to the gates of SCR51 to SCR62 and used for controlling the switching of the SCR's. The isolation amplifiers I51 to I62 serve the purpose of keeping the signals G1 to G12 electrically isolated from the power source RST and supplying electric power sufficient to turn on SCR51 to SCR62. They are readily materialized with well-known pulse transformers, for example. Denoted by R51 and R52 are limiting resistors which are necessary because pulses for the forward rotation and pulses for the backward rotation may be issued simultaneously as will be described later.

When the three-phase power source produces a three-phase voltage as shown at section (a) in FIG. 8, the firing pulses G1 to G12 occur as shown at section (b) in FIG. 8 during the forward rotation of the motor and as shown at (c) in FIG. 8 during the backward rotation of the motor. Consequently, the electric current to the motor flows during the time intervals as hatched at (d) in FIG. 8. This means that the flow of electric current to the motor can be controlled by adjusting the interval Tw, namely, by selecting a suitable portion or timing in the half-period Tr of the three-phase voltage at which the firing pulses are applied.

To compensate for the characteristic of thyristors, firing pulses for the forward rotation and those for the backward rotation of the motor may be simultaneously issued on condition that the interval Tw is small. All the on-off operations of these thyristors are governed by the signals G1 to G12.

Figure 9:
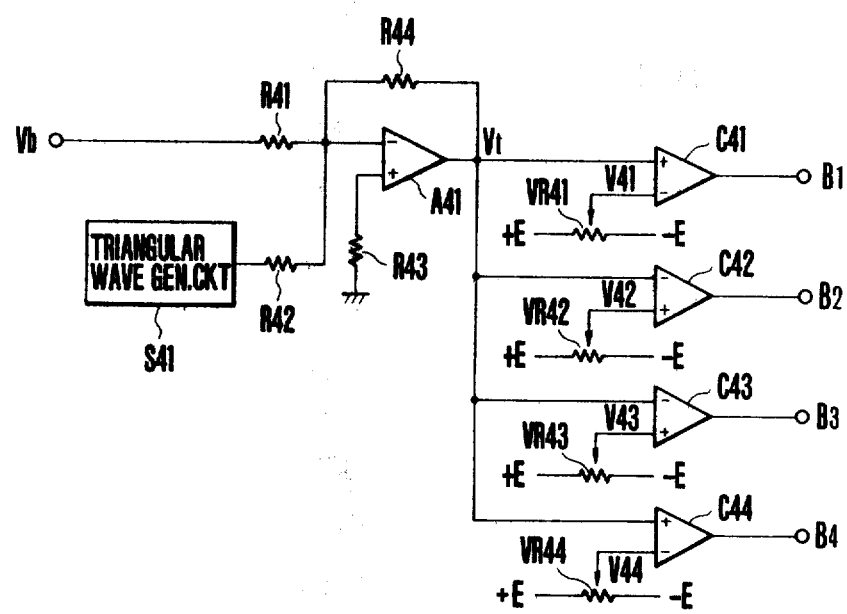
FIG. 9 is a circuit diagram of a conventional pulse controller for the transistor power amplifier.
Figure 10:
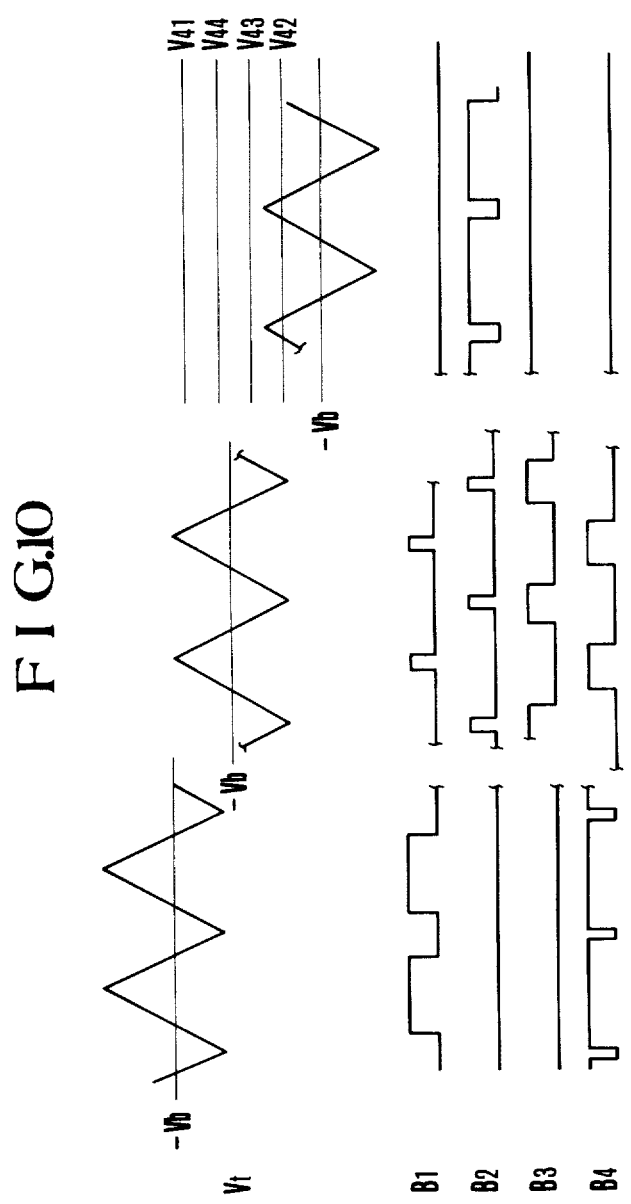
FIG. 10 is a time chart useful in explaining the operation of the pulse controller of FIG. 9.

Now that the operation of the power amplifier 5 has been described, the pulse controller 4 which issues desired timing pulses to the power amplifier 5 will be described. FIG. 9 is a typical pulse-width modulating circuit which produces base signals for transistors. Designated by S41 is a triangular wave generating circuit which is well known in the art. The output Vb of the current amplifier is added in an operational amplifier A41 to the output of the generator S41. The combined output is led to the comparators C41 to C44 and compared therein with the voltages set by variable resistors VR41 to VR44 to produce a desired pulse width. FIG. 10 shows the time chart of the circuit of FIG. 9. The output Vt of the operational amplifier A41 is obtained by adding the triangular wave generated by S41 to the output Vb of the current amplifier and reversing the phase of the resultant sum. The central voltage of the triangular wave, therefore, is varied as illustrated with the value of the output Vb. If the voltages V41 to V44 as illustrated in the diagram are set by VR41 to VR44, the pulse width of the signals B1 to B4 varies with the output Vb. Here, V41 and V44 are reference voltages for the forward rotation and V42 and V43 are reference voltages for the backward rotation of the motor. These reference voltages are generally adjusted so that V41 and V44 on the one hand and V42 and V43 on the other hand have mutually opposite polarities but equal absolute values so far as the output Vb has good zero balance.

Figure 11:
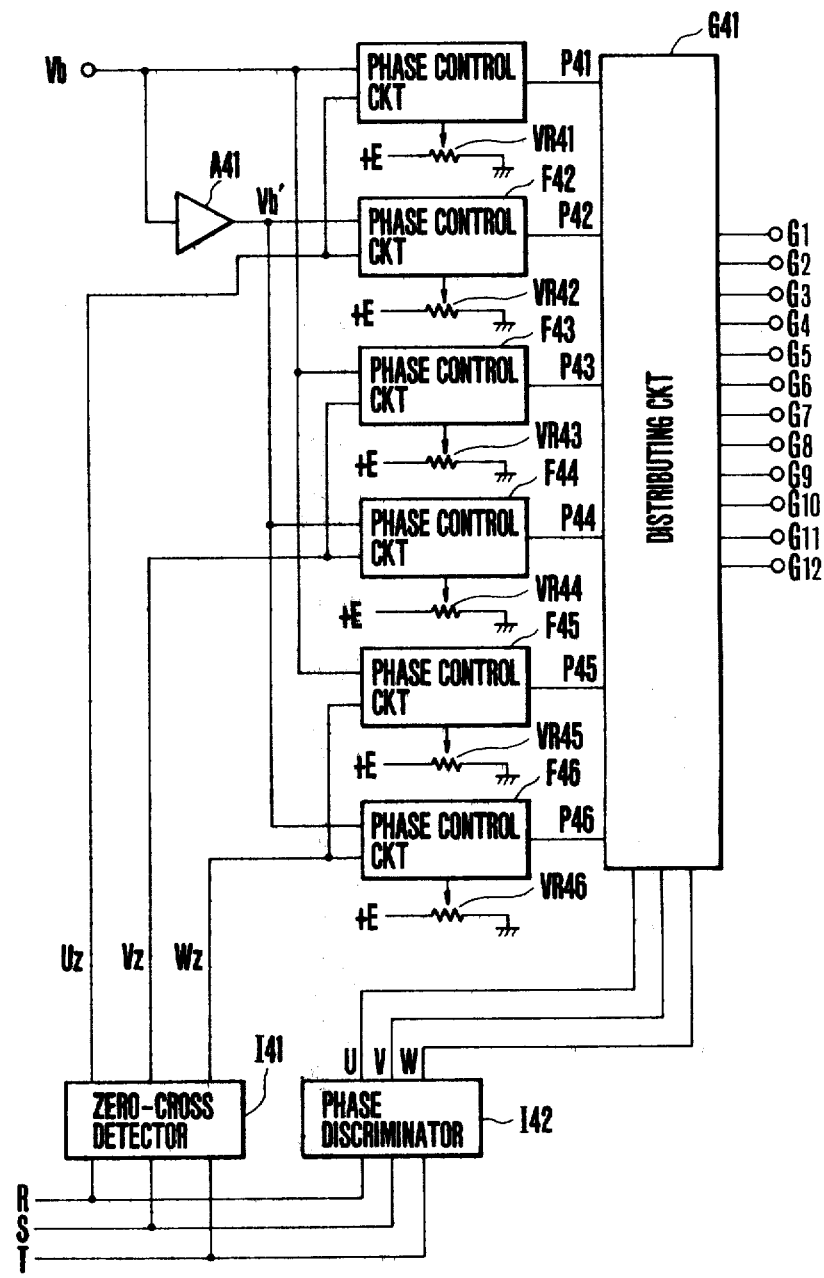
FIGS. 11 to 13 are circuit diagrams of a conventional pulse controller for the thyristor power amplifier.
Figure 12:
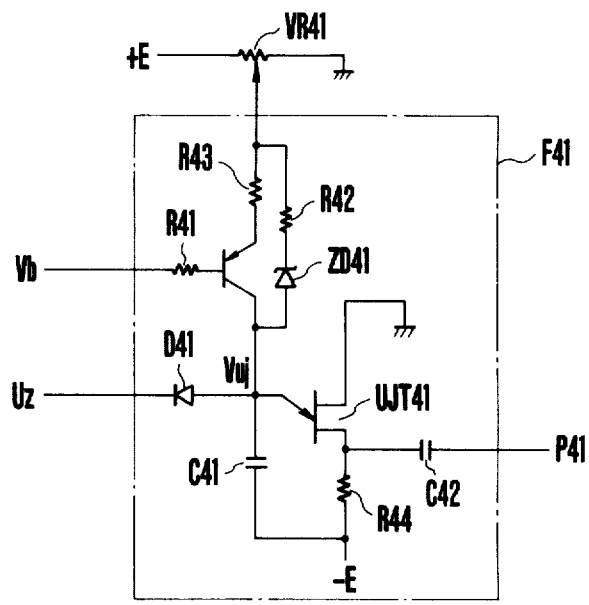
Figure 13:
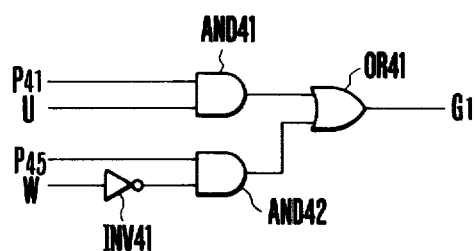
Figure 14:
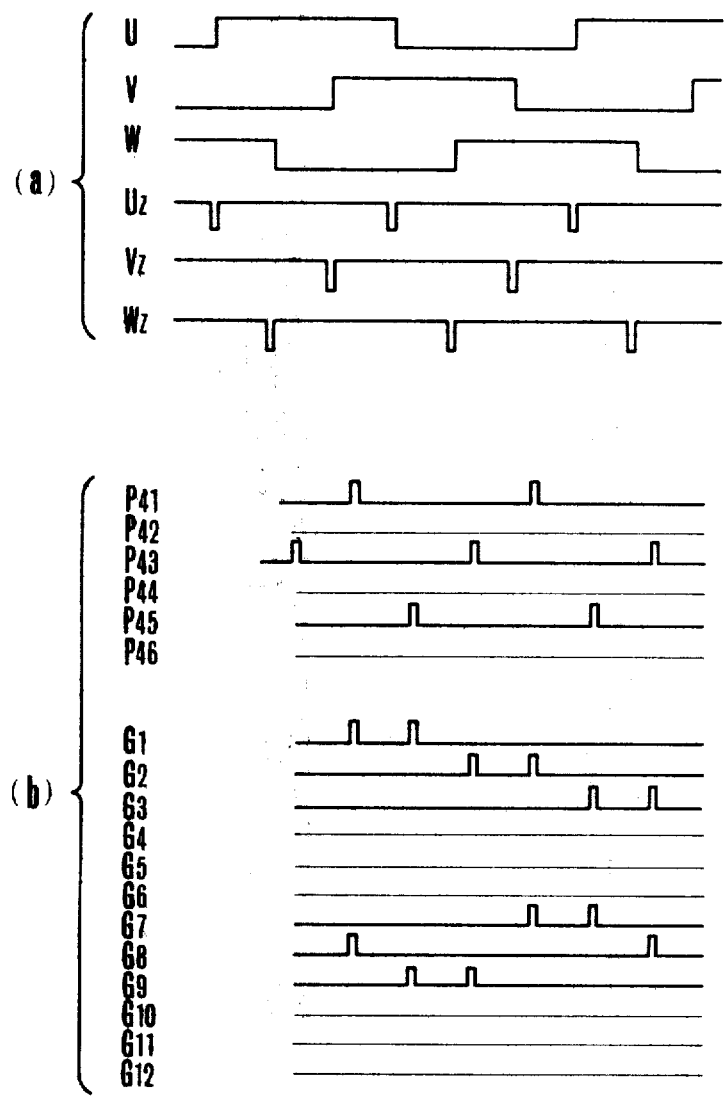
FIG. 14 illustrates in sections (a) and (b) a time chart useful in explaining the operation of the circuits shown in FIGS. 11 and 12.
Figure 15:
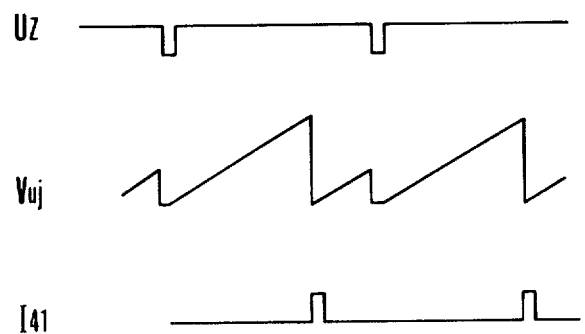
FIG. 15 is a similar time chart to FIG. 14.

Typical circuits for the pulse controller using thyristors are shown in FIGS. 11 to 13 and the time charts for these circuits are shown in FIG. 14 and FIG. 15. In FIG. 11, I41 denotes a zero-cross detector circuit for providing electrical insulation from the three-phase power source and detecting the zero cross. By I42 is denoted a phase discriminator circuit for similarly providing electrical insulation from the three-phase power source and effecting phase discrimination. These circuits are well known in the art. They are synchronized with the three-phase power source to produce zero-cross pulses Uz, Vz, and Wz and phase signals U, V, and W as illustrated at section (a) in FIG. 14. The output Vb of the current amplifier, the inverting signal Vb' of the output Vb produced by the inverting amplifier A41 are led, along with the zero-cross pulses Uz, Vz, and Wz, to phase control circuits F41 to F46. The phase control circuit F41 as exemplified in FIG. 12 serves the purpose of comparing the voltage of the output Vb with the voltage set by VR41, charging a capacitor C41 with an electric current proportional to the difference found by the comparison thereby enabling a uni-junction transistor UJT41, and producing a pulse P41 deviated in phase from the zero-cross pulse by the magnitude of the time corresponding to the difference between the voltage of the output Vb and the voltage set by VR41. Denoted by C42 is an AC coupling capacitor. The time chart of this operation is shown in FIG. 15. Here, Vji denotes an emitter voltage of UJT41. The phase control circuits F42 to F46 have the same function. The phase control circuits F41, F43 and F45 operate when the voltage Vb has a minus sign and the circuits F42, F44, and F46 operate when the voltage has a plus sign. The circuits F41 and F42 operate for the zero-cross pulse Uz, F43 and F44 for the zero-cross pulse Va, and F45 and F46 for the zero-cross pulse Wz, respectively. The variable resistors VR41 to VR46 determine the firing phase when the voltage of the output Vb is 0 (zero) volt and adjust the mutual balance of the phase control circuits F41 to F46. Thus, the outputs P41 to P46 of the circuits F41 to F46 are pulses deviated in phase from the zero-cross pulses in proportion to the magnitude of the output Vb. These outputs are then distributed to the corresponding thyristors. In FIG. 11, G41 denotes a distributing circuit for allocating the outputs P41 to P46 to the corresponding thyristors in accordance with the phase signals U, V, and W. This circuit can simply be composed of AND gates and an OR gate, and contains such a circuit as shown in FIG. 13 which is associated with the signal G1, having AND circuits AND 41 and AND 42, an OR circuit OR41 and an inverter INV41. Similar circuits are associated with the signals G2 to G12. The timing chart for P41-P46 and G1-G12 for the forward rotation of the motor is shown at (b) in FIG. 14.

The construction and function of the conventional motor control apparatus using the analog circuits have been described. At numerous positions of the apparatus, many variable resistors are used for those adjustment of the gain and setting of the limiters which are required for the motor to possess desired characteristics, and effecting the null-point adjustment indispensably required by the analog circuit. The adjustment of these variable resistors is quite complicate and troublesome because it requires measurement of analog voltages at prescribed points or entails observation of waveforms displayed on an oscilloscope. Fine adjustment calls for a highly-skilled handling.

Moreover, the analog circuit necessitates numerous parts which are often rated for widely different values of resistance and capacitance. For the analog circuit to meet the demand for high accuracy and high stability, it is inevitably increased greatly in scale and cost.

With a view to overcoming the aforementioned disadvantages of the analog circuit, an effort to digitize the functions of the analog circuit has been made in numerous fields. The digital processing is essentially free from the phenomenon of drift and is stable. It effects the setting of gain very simply, because it functions effectively on the parameter of digital data without resort to the variable resistor which demands delicate adjustment. The accuracy of the operation can be heightened as much as desired by increasing the total number of bits involved.

The functions such as multiplication and integration are rather readily materialized with the analog circuit. When they are to be materialized with a conventional digital circuit using transistors and SSI's, such a digital circuit has often been proved to be quite voluminous and expensive.

Owing to the remarkable progress made recently in the development of electronic elements, it has now become easy to secure a high-quantity micro-processor at low cost. The adoption of such an advanced microprocessor promises a great merit of the digital processing. In the field of the motor control apparatus, a control scheme using a micro-processor has already been proposed.

Figure 16:
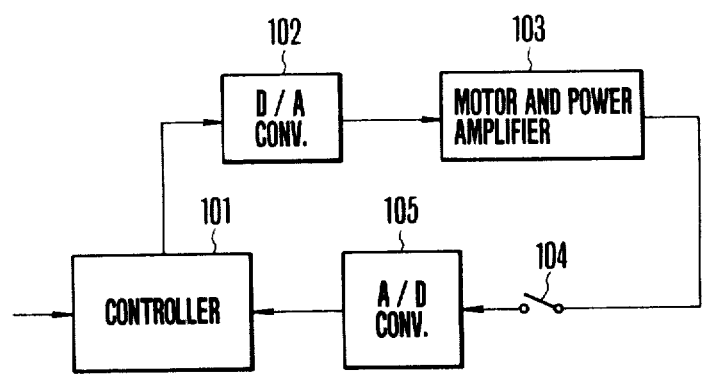
FIG. 16 is a block diagram of a conventional motor control apparatus using a microprocessor.

A block diagram illustrated in FIG. 16 is introduced by "Incremental Motion Control" (Kuo/Tal) by SRL Publishing Co., 1978, P315. In this diagram, 101 denotes a microprocessor based controller, 102 a D/A converter, 103 a motor and power amplifier, and 105 an A/D converter. Denoted by 104 is a sampler, implying that the processing by the micro-processor is essentially based on the control of sample values. It is noted that the micro-processor 101 receives the feedback signal of the motor via the A/D converter 105 and effects necessary data processing within the processor so as to control the motor as desired. The digital data which issue in consequence of the data processing are not directly used for the control of the motor but are converted into an analog voltage by the A/D converter. This analog voltage is amplified in the motor and power amplifier 103 and then used for the control of the motor.

Comparison of the block diagram of FIG. 16 with that of FIG. 1 reveals that 101 of the former diagram includes the functions of the blocks 1, 2 and 3 of the latter diagram and the output of 102 of the former diagram equals the output of the current amplifier 3 of the latter diagram, namely, the analog voltage coresponding to the drive command Vb. The block 103 of FIG. 16 is equivalent to the pulse controller 4 which is one of the main functional blocks of the motor control apparatus of FIG. 1. As already shown, the output of the pulse controller 4 of FIG. 1 is in the form of pulses to be applied to transistors or thyristors. They are binary data which vary with time. The output, therefore, can be treated as digital values. If an expedient is perfected which enables all the steps of operation, involved in producing the output of the pulse controlle 4, i.e., on-off digital data from the digital data delivered by the controller 101 of FIG. 16, to be digitally processed, then the relevant analog circuits included in the D/A converter 105 and the motor and power amplifier 103 of FIG. 16 can be rendered completely useless.

The present invention, based on the aforementioned nature of the output of the motor control apratus, demonstrates that all the processings for imparting functions to signals, namely, those involved in producing on-off pulse signals from incoming velocity commands with the exception of those involved in conversion of energy and purely attributive conversion of signals such as A/D conversion, can be digitally executed by a processor. How all the functions of the motor control apparatus are digitally processed by the present invention will be described below through comparison of the present invention with the conventional control apparatus using the analog circuit.

Figure 17:
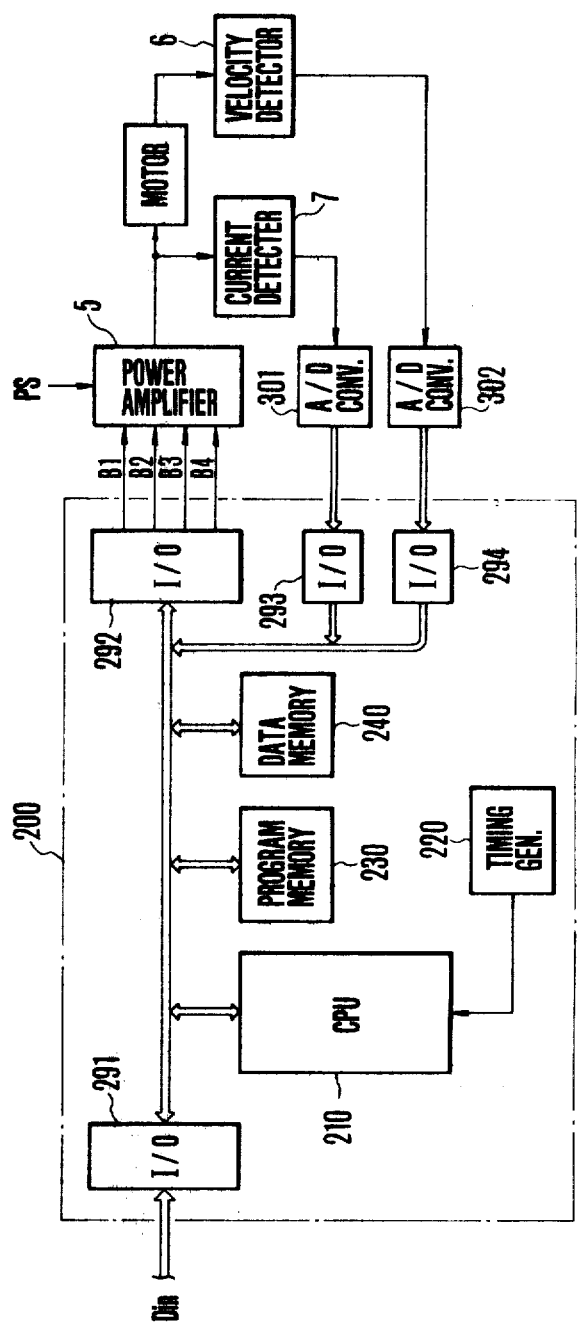
FIG. 17 is a block diagram of a motor control apparatus embodying the invention.

A block diagram of one embodiment of the motor control apparatus of this invention is shown in FIG. 17. The motor or moving body controlled by the motor M, the velocity detector 6, the current detector 7, and the power amplifier 5 are perfectly equivalent to those of FIG. 1. By 200 is denoted a digital processor which comprises a CPU 210, a reference timing generator 220, a program memory 230, a data memory 240, input ports 291, 293, and 294, and an output port 292. The velocity command Din is delivered via the input port 291 into the processor. The outputs of the velocity detector 6 and the current detector 7 are converted into digital data respectively by the A/D converters 301, 302 and delivered via the input ports 293, 294 into the processor. The output of the processor to the motor is delivered via the output port 292 into the power amplifier 5.

Figure 18:
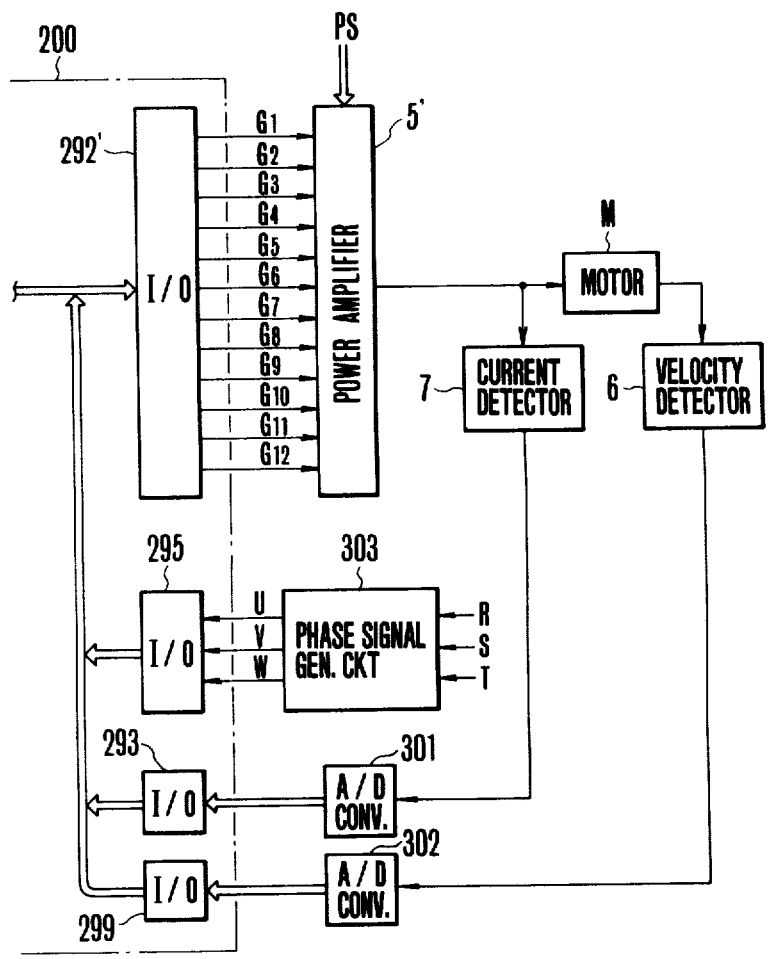
FIG. 18 is a block diagram showing the connection to the thyristor power amplifier in the embodiment of FIG. 17.

In FIG. 17, the power amplifier 5 is illustrated as formed of transistors. When the power amplifier is formed of thyristors, an output port 292' having additional output channels and an input port 295 for receiving the phase signals U, V and W are provided as shown in FIG. 18. In this figure, there is also provided a phase signal circuit for producing phase signals. This circuit corresponds to the phase discriminator circuit 142 of FIG. 11. The converters 301 to 303 serve the purpose of converting incoming signals into digital data so as to be admitted into the processor. They are not intended to impart functions to the signals. As already described, in the apparatus of FIG. 1, the blocks 2 to 4 play the part of imparting functions to the signals. In the present invention, the impartation of such functions to the signals is wholly effected by the data processing within the processor.

How the impartation of functions to the signals is accomplished within the processor will be described below through comparison of the present invention with the conventional apparatus. As is widely known, the digital processor carries out a series of data processings by sequentially executing the stored programs. The programs include not only the instructions for arithmetic operations and logic operations but also various judging conditions concerning the load storage in memories, the reference to the input port, and the delivery to the output port. The programs can be executed as synchronized with the timing given via an interruption channel by an external source. In FIG. 17, the programs are stored in the program memory 230. The CPU fetches a program to be executed from the program memory 230, decodes the instructions in the program, processes data held in the data memory 240 when necessary or reads the contents of the input ports 291, 293, and 294 into the memory or picks data from the data memory 240 and delivers them to the output port 292. The series of processings just described is carried out as synchronized with the timing in accordance with the interruption pulse from the reference pulse generator 220. A typical case in which the circuit of the velocity amplifier of FIG. 2 is executed by the processor is illustrated in FIG. 19. By 291 and 294 are denoted input ports, to which are delivered the digital data Din and Dv corresponding to the velocity command Vin and the velocity detecting signal Vv. Denoted by 261 and 262 are part of the data memory 240, in which are set predetermined parameters. Also memories 241 and 242 are part of the data memory 240. The memory 241 is used as an integrator playing the part of an accumulator and the memory 242 serves to store the results of accumulation. The signs +, −, and x represent the operational functions to be fulfilled by the CPU respectively for addition, subtraction, and multiplication. These arithmetic operations are executed in accordance with the programs stored in the program memory. And the programs are executed at a fixed period $\Delta t$ in accordance with the timing given by the reference pulse generator 220.

The formula (1) representing the function of the velocity amplifier may be transformed into a real-time differential equation as shown below.

$$T_1 Da + Da = Kv\{T_2(Din + Dv) + (Din + Dv)\} \qquad (2)$$

where Da represents the digital data coresponding to Va. The processing of the velocity amplifier is with a view to calculate the value of Da hourly.

The formula (2) may be transformed into an integral equation as follows.

$$T_1 Da - T_2 Kv(Din + Dv) = \int \{Kv(Din + Dv) - Da\} dt \qquad (3)$$

Din, Dv, and Da are data which vary with time. Let Din(t), Dv(t), and Da(t) stand for the respective data, then the integral term of the formula (3) at a time $t = n \cdot \Delta t$ may be approximated as follows.

$$\int \{Kv(Din(t) + Dv(t)) - Da(t)\} dt = \qquad (4)$$

$$\Delta t \sum_{k=0}^{n} [Kv\{Din(k\Delta t) + Dv(k\Delta t)\} - Da(k\Delta t)]$$

The expression (4) signifies that the function of integration equals the accumulation of data. The formula (3) may be rewritten with the formula (4) as follows.

$$Da(n \cdot \Delta t) = \frac{T_2 + \Delta t}{T_1 + \Delta t} \cdot Kv\{Din(n \cdot \Delta t) + Dv(n \cdot \Delta t)\} + \qquad (5)$$

$$\frac{\Delta t}{T_1 + \Delta t} \sum_{k=0}^{n-1} [Kv\{Din(k \cdot \Delta t) + Dv(K \cdot \Delta t)\} - Da(k \cdot \Delta t)]$$

The formula (5) signifies that the value of Da at a given time can be determined on the basis of the values of Din and Dv at the present time and those of Din, Dv, and Da at a past time. In FIG. 19, the parameter data corresponding to Kv, $(T_2+\Delta t)/(T_1+\Delta t)$, and $\Delta t/(T_1+\Delta t)$ are set in advance in memories 261, 262, and 263. By 241 is denoted an accumulator for storing the sum of the progression of the second term in the formula (5).

It is now assumed that the content Dj(0) of the accumulator in its initial state has been 0. Then, at a time $t = \Delta t$, the program is executed. It is further assumed that at this time, Din ($\Delta t$) and Dv($\Delta t$) are applied to the input ports 291 and 294, respectively. In this case, the value obtained by multiplying the sum of Din ($\Delta t$) and Dv($\Delta t$) by the content of the memory 261 is represented by Di($\Delta t$). Since the content of the memory 241 is Dj(0) = 0, the product of the multiplication of Di($\Delta t$) by the content of 262 is obtained as Da($\Delta t$). This product is stored in a memory 242.

Further, the difference resulting from the subtraction of Da($\Delta t$) from Di($\Delta t$) is stored in the memory 241. This difference is represented by Dj($\Delta t$).

Subsequently, at a time $t = 2\Delta t$, the program is executed again. Di(2$\Delta t$) is calculated from the values Din(2$\Delta t$) and Dv(2$\Delta t$) applied to the input ports 291 and 294 at this time. The product of the multiplication of Di(2$\Delta t$) by the content of the memory 262 and the product of the multiplication of the current content Dj($\Delta t$) of the memory 241 by the value of the memory 263 are totalled. The sum thus obtained is represented as Da(2$\Delta t$) and stored in the memory 242. The difference of the subtraction of Da(2$\Delta t$) from Dj(2$\Delta t$) is represented by Dj(2$\Delta t$) and stored in the memory 241.

By the repetition of the procedure described above, the arithmetic operation of the formula (5) can be carried out. Consequently, the data, Da, stored in the memory 241 equals the output of the velocity amplifier.

Figure 21:
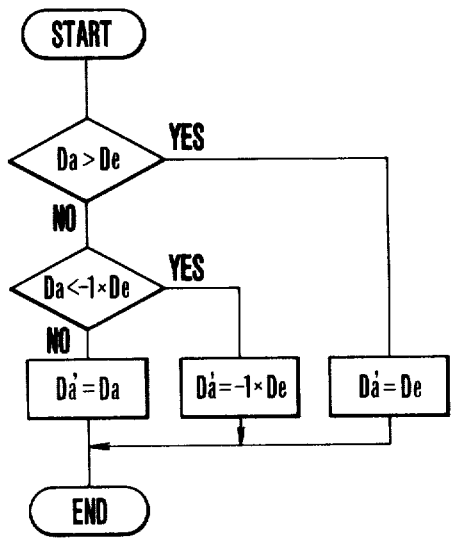
FIG. 21 is a flow chart useful in explaining the operation of the processor of FIG. 20.

A case in which the function of the current amplifier shown in FIG. 3 is executed by the processor will be illustrated in FIG. 20 and FIG. 21. In FIG. 20, memories 264 and 265 are part of the data memory. It is assumed that the parameter data coresponding to the limiting value (absolute value) of current and the gain of current feedback loop have been stored in these memories in advance. Similarly, memories 242 and 243 are part of the data memory. The memory 242 is used for storing the digital data, Da, corresponding to the output Va of the velocity amplifier and the memory 243 for storing the digital data, Db, corresponding to the output Vb of the current amplifier.

Applied to an input port 293 is the data, Dc, corresponding to the output Vc of the current detector. The symbols +, x, CP, and SEL represent the operations performed by the CPU and respectively stand for addition, multiplication, comparison, and selection. Similarly to the preceding case, these operations are executed in accordance with the programs stored in the program memory. These programs are executed at a fixed period in accordance with the timing given by the reference pulse generator. The current command data, Da, is first compared with the content D1 of the memory 264 and a value obtained by inverting the sign thereof. As the result of this comparison, D1 is selected when Da is greater than D1, −D1 is selected when Da is smaller than D1, and Da itself is otherwise selected to provide Da'. These steps of processing are illustrated in a flow chart of FIG. 21. From this flow chart it will be noted that the limitter of ±D1 is applied to Da. The Da' is added to the Dc applied to the input port 293 and the sum is multiplied by the content of the memory 265 to produce Db, which is stored in the memory 243. The Db corresponds to the output Vb of the current amplifier.

Figure 22:
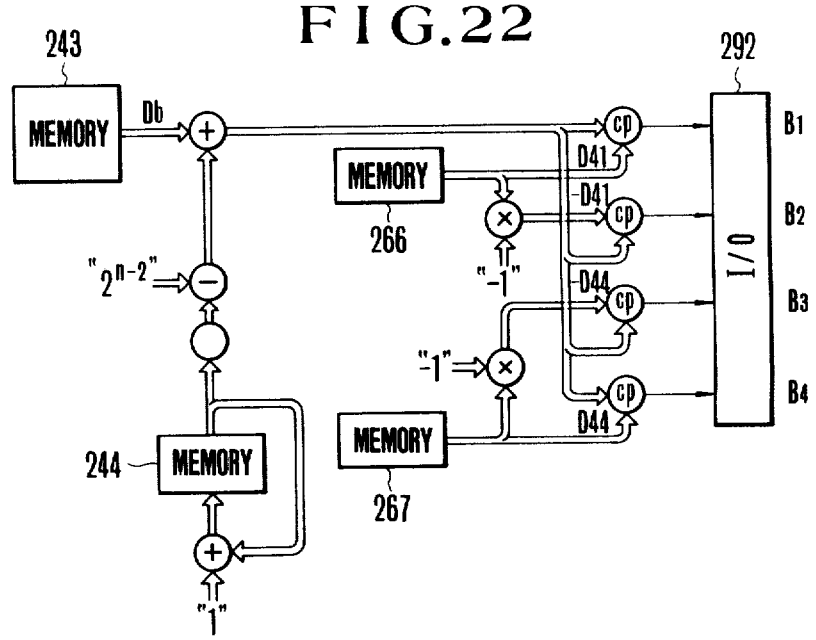
FIG. 22 is a block diagram showing an embodiment of the execution of the function of pulse controller for the transistor power amplifier by the processor.
Figure 23:
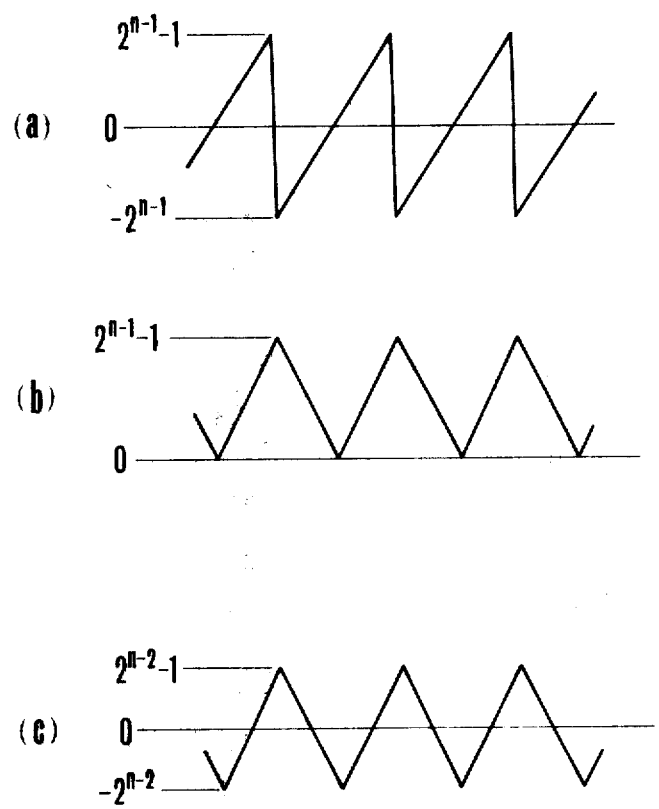
FIG. 23 illustrates in sections (a) to (d) a time chart useful in explaining the operation of the processor of FIG. 22.

FIG. 22 illustrates a case in which the function of the pulse controller using transistors is executed by the processor. This diagram corresponds to that of FIG. 9. Here, memories 266 and 267 are part of the data memory. The parameter data coresponding to the voltages V41 and V42 set by variable resistors VR41 and VR44 in FIG. 9 are set in advance in the memory 226 and the parameter data corresponding to the voltages V43 and V44 set by variable resistors VR43 and VR44 in FIG. 9 are set in advance in the memory 267. The voltages V41 and V42 in FIG. 9 on the one hand and V43 and V44 in FIG. 9 on the other hand must have equal absolute values and mutually opposite signs when the addition signal Vt of the triangular wave and the Vb have good zero balance. Therefore, in digitizing the signals, use of two types of parameter data will suffice. Memories 243 and 244 are also part of the data memory. The memory 243 is used for storing the data Db corresponding to Vb and the memory 244 is used as an integrator for producing the triangular wave. Denoted by 292 is an output port. Outputs B1 to B4 which are produced from the output port 292 are equal to those of B1 to B4 shown in FIG. 9. The symbols +, −, x, CP, and ABS represent the operations of CPU, respectively denoting addition, subtraction, multiplication, comparison, and absolute value. These operations are performed in accordance with the programs stored in the program memory and these programs are executed at a fixed period similarly to the aforementioned case. The content of the memory 244 is incremented by +1 each time the program is executed. It is assumed that the bit width of the memory 244 is n and the content of the memory 244 is expressed by the complement of 2. Then, the content of the memory 244 overflows each time it is incremented $2^n$ times. Consequently, the content of the memory 244 is shifted from the positive maximum to the negative minimum as shown at section (a) in FIG. 23. When the value of the memory 244 is converted to an absolute value, the result is as shown at (b) in FIG. 23. Further subtraction of $2^{n-1}$ from the result gives a value as shown at (c) in FIG. 23. The ultimate result just corresponds to the output of the triangular wave generating circuit S41 in FIG. 9. Then, this value is added to the data Db stored in the memory 243 and the resultant sum is compared with the values D41 and D44 stored in the memories 266 and 267 and also with the inverted values —D41 and —D44. By setting the result of this comparison (which result is to be indicated as 1 when the data from the lefthand side of CP is greater than the data from the lower side of FIG. 22) to a corresponding position of the output port 292, desired phase modulated pulses B1 to B4 can be produced.

Figure 24:
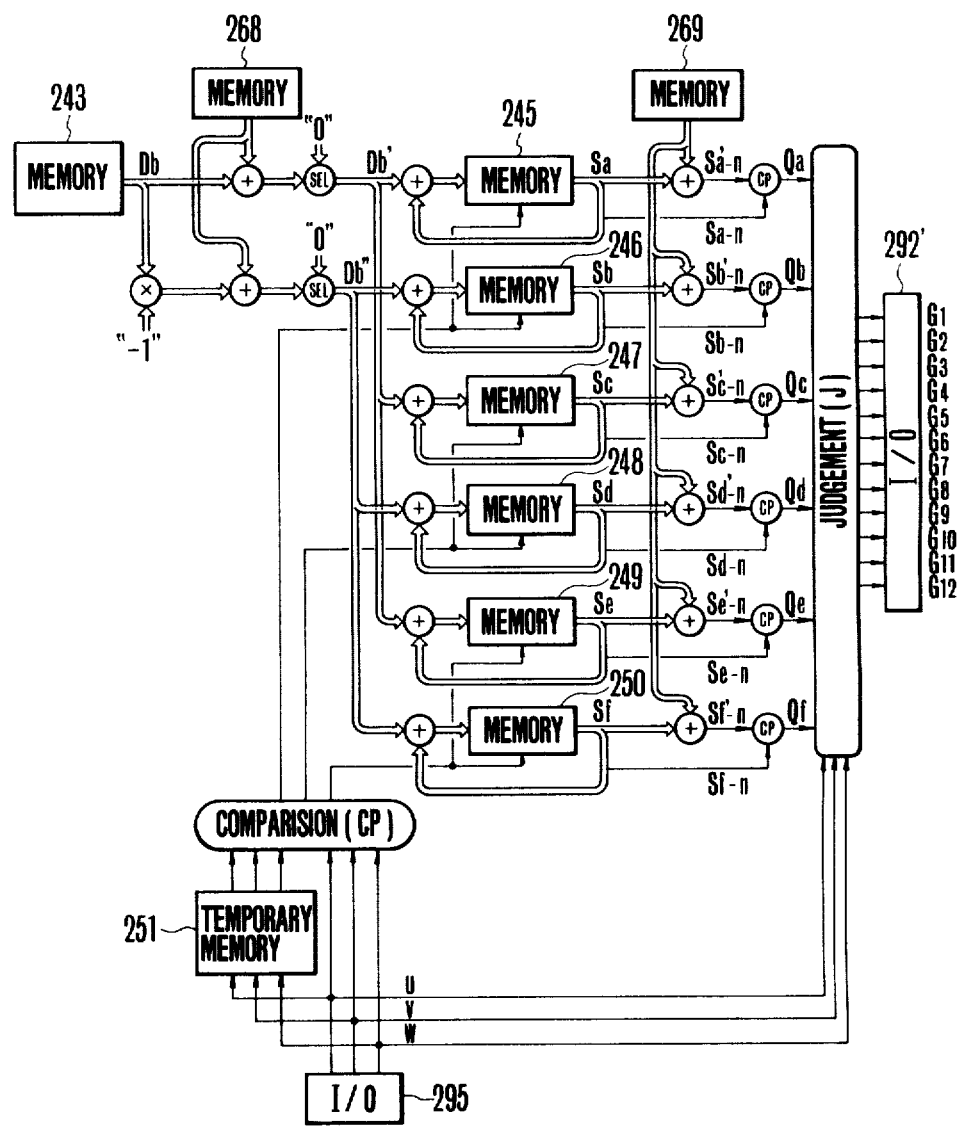
FIG. 24 is a block diagram showing an embodiment of the execution of the function of pulse controller for the thyristor power amplifier by the processor.

FIG. 24 illustrates a case in which the function of the pulse controller using thyristors is executed by the processor. This diagram corresponds to that of FIG. 11. Memories 243, 245 to 250 are part of the data memory. The memory 243 is used for storing the data Db corresponding to the output Vb of the current amplifier. In memories 268 and 269, the parameter data for the phase control are stored in advance. The memories 245 to 250 are used as integrators synchronized to three phases and they correspond to the capacitor C41 and others shown in FIG. 12. Denoted by 251 is a temporary memory used for discriminating the three-phase zero cross. An input port 295 receives three-phase data. An output port 292 delivers outputs which are entirely the same as the firing pulses G1 to G12 shown in FIG. 11. The symbols +, x, CP, J, and SEC represent the operational functions of CPU, respectively denoting addition, multiplication, comparison, judgement, and selection. These operations are performed in accordance with the programs stored in the program memory and the programs are executed at a fixed period.

Figure 25:
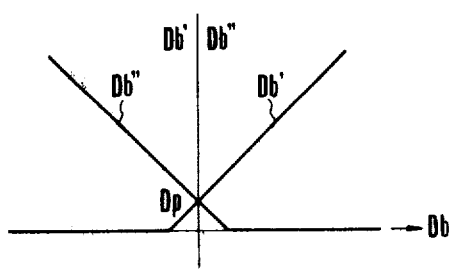
FIG. 25 is a graph useful in explaining the FIG. 24 embodiment.
Figure 26:
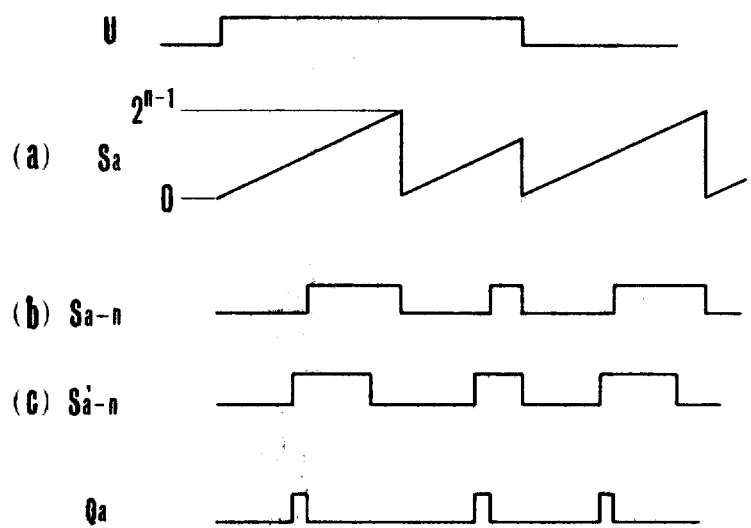
FIG. 26 illustrates in sections (a) to (c) a time chart useful in explaining the FIG. 24 embodiment.
Figure 27:
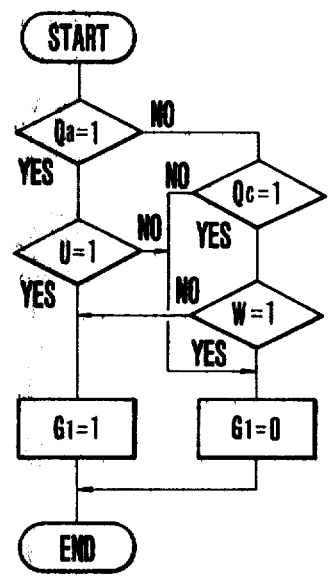
FIG. 27 is a flow chart for explaining the FIG. 24 embodiment.

The command data Db stored in the memory 243 and the inverted data are added to the content Dp of the memory 268. From the resultant sums, the positive data alone are selected to provide Db' and Db" (Db' and Db" each become 0 when the sum of Db and Dp has a negative value). The correlations of Db' and Db" to Db are shown in FIG. 25. The parameter data Dp which are set in the memory 268 is intended to give a bias when Db is 0 and corresponds to the voltages which are determined by variable resistors VR41 to VR46 of FIG. 11. The variable resistors VR41 to VR46 serve to give biases and, at the same time, permit mutual balancing of the phase control circuits F41 to F46. Thus, in digitizing the signals, use of one kind of parameter data will suffice. Each time the program is executed, the memories 245-250 are accumulated by the value of Db' or Db". Further, the current phase data U, V, and W which are the contents of the input port 295 are compared with the preceding phase data stored in the temporary memory 251. When a change is found, only the corresponding one of the memories 245-250 is cleared. For example, the value of the output Sa of the memory 245 (here, Sa is treated as data without sign) is changed as shown at (a) in FIG. 26. In this case, the most significant bit Sa—n of Sa is changed as shown at (b) in FIG. 26. The most significant bit Sa'—n of th value Sa' which result from the addition of Sa to the content of the memory 269 is changed as shown at (c) in FIG. 26. Comparison of Sa—n with Sa'—n gives a one-bit data Qa which varies with time. The parameter data fed to the memory 269 is used for determining the pulse width of Qa. In entirely the same way, the outputs Sb to Sf of the memories 246-259 yield Qb to Qf. These outputs Qa to Qf correspond to six one-bit data corresponding to P1 through P46 of FIG. 11 and are subjected to conditional judgement by the phase data U, V and W to produce 12 one-bit data G1 through G12. A flow chart of the operation for producing G1, for example, is illustrated in FIG. 27. The conditional judgement corresponds to the function of G41 in FIG. 11. When the resultant outputs G1 through G12 are set to prescribed positions of the output port 292', desired firing pulses are produced.

It has been demonstrated that the present invention enables all the functions of the conventional motor control apparatus using analog circuits to be effectively adapted for digital processing by the processor. Comparison of the typical conventional analog circuit and the embodiment of the present invention reveals that the analog signals of the former correspond to the digital data stored in the data memory of the latter and the addition, multiplication and other operations of analog voltages involved in the former correspond to the addition, multiplication and other operations of digital data by CUP in the latter. Besides, the former realizes the function of integration by use of capacitors, whereas the latter effects this function by accumulating digital data in the data memory. The values such as of gain which are determined by variable resistors or circuit constants in the former are determined by the parameter data set in advance in the data memory in the latter. In processing the digital data, the variable resistors essential for balance adjustment in the analog circuit can be dispensed with.

The analog circuit, as viewed from the standpoint of circuit diagram, has no element admitting unwanted time lag except for integrating circuits designed for the improvement of control characteristic (though, actually, the physical properties of circuit elements admit of delay factors), whereas the digital circuit essentially operates on the principle of sample value control and inevitably admits of delays of sampling period. The delay, however, is not serious since the sampling is possible at a far smaller sampling period than the frequency characteristic of the motor.

It is now clar that all the functions of the motor control apparatus can be adapted by this invention for digital processing by the processor. The apparatus of this invention requires only units for the conversion of energy and AD conversion units in addition to the processor.

The preferred embodiment of this invention has been described as involving use of a velocity detection unit which produces analog signals as its output and causes the signals to be delivered via the AD converter into the processor. If this velocity detection unit is designed to give pulse trains or digital data at its output, then the processor is capable of directly receiving the velocity detection data without requiring any intervention of the AD converter.

Unlike the conventional apparatus, the apparatus of this invention has absolutely no use for analog circuits anywhere in all the stages from the issuance of velocity command to the energy conversion. It materializes a high-performance motor control apparatus which completely eliminates complicated and troublesome variable resistor adjustment and assures freedom from various causes of instability including the phenomenon of drift. Further, all the data contained in the processor can be delivered to an external unit. Consequently, the various signals which have heretofore been measured with an oscilloscope or a voltmeter can be directly displayed digitally without use of any measuring instrument. In addition, all the data that pertain to the function of motor control are stored in the processor. These data can be freely transferred from one processor to another. Thus, the processor itself which is responsible for the control of the motor or some other processor which communicates with that processor is capable of monitoring the condition of control or changing the parameter data moment after moment so as to ensure the optimum control. For example, the voltage ripple characteristic of the velocity converter and the torque ripple characteristic of the motor are expressed in the form of functions of the positions of their rotations when the velocity converter and the motor are rotary machines. Consequently, these characteristics can be corrected with such positions of rotations (or with command positions. For the purpose of positional control, such positional data are learnt from a suitable external data processing unit.). These heretofore unattainable functions can be materialized by the present invention. Thus, the present invention not merely overcomes the disadvantages of the conventional motor control apparatus but also promises numerous functions of high quality which have never existed in the past.

What is claimed is:

1. A motor control apparatus comprising:

rotary drive means for driving an object to be controlled;

velocity detecting means for detecting the velocity of said rotary drive means;

current detecting means for detecting the operating current of said rotary drive means;

a digital processor having a first arithmetic function for producing a current command data from an external velocity command data and a velocity detection data corresponding to an output of said velocity detecting means, a second arithmetic function for producing a drive command data from the current command data and a current detection data corresponding to an output of said current detecting means, and a third arithmetic function for converting the drive command data into on-off pulse signals, said digital processor including input ports for receiving digital data of the velocity command data, velocity detection data and current detection data, a program memory for storing programs for performing a series of data processings on said digital data to apply a desired response characteristic to said rotary drive means, a reference timing generator which produces a signal necessary for executing said programs in synchronism with time, and an output port for delivering out the results of the data processing on the program as the on-off pulse signals; and power amplifier means including switching elements for amplifying said on-off pulse signals to control the operation of said rotary drive means.

2. A motor control apparatus according to claim 1 wherein said switching elements are transistors.

3. A motor control apparatus according to claim 1 wherein said switching elements are thyistors, said apparatus further comprises a phase signal generator circuit responsive to multi-phase voltages to produce phase signals, and said digital processor further comprises an input port for receiving the phase signals.

* * * * *